United States Patent

Graser

[11] 4,145,356
[45] Mar. 20, 1979

[54] PROCESS OF PREPARING PYRANTHRONE PIGMENTS

[75] Inventor: Fritz Graser, Ludwigshafen, Fed. Rep. of Germany

[73] Assignee: BASF Aktiengesellschaft, Rheinland-Pfalz, Fed. Rep. of Germany

[21] Appl. No.: 870,097

[22] Filed: Jan. 17, 1978

[30] Foreign Application Priority Data

Jan. 26, 1977 [DE] Fed. Rep. of Germany ....... 2702985

[51] Int. Cl.² ............................................... C09B 3/44
[52] U.S. Cl. .................................................. 260/360
[58] Field of Search ......................................... 260/360

[56] References Cited

U.S. PATENT DOCUMENTS

| | | | |
|---|---|---|---|
| 1,596,528 | 8/1926 | Gubelmann | 260/360 |
| 2,055,699 | 9/1936 | Ogilvie et al. | 260/360 |

OTHER PUBLICATIONS

*Chemical Abstracts*, vol. 76, Jan. 23, 1971, p. 80, abstract No. 61054m, Nakano et al., "Stabile Orange Pigment in Organic Solvent".

*Primary Examiner*—Allen B. Curtis
*Assistant Examiner*—Raymond Covington
*Attorney, Agent, or Firm*—Oblon, Fisher, Spivak, McClelland & Maier

[57] ABSTRACT

Pyranthrone pigments of the formula

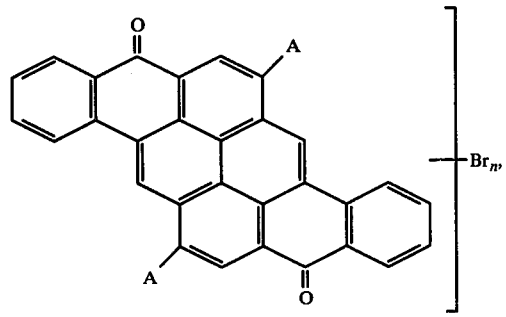

wherein n is 0 or 1, wherein when n is 0, each A is hydrogen or chlorine, and when n is 1, each A is chlorine are prepared by crystallizing a finely divided crude pyranthrone pigment in an organic polar solvent, in the presence of from 0.5 to 10% by weight, based on the crude pigment, of an anthraquinone compound of the formula

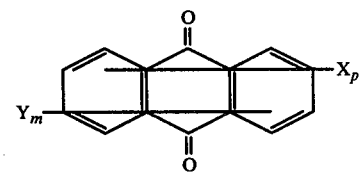

wherein X is chlorine, Y is alkyl of 1 to 4 carbon atoms, hydroxyl, carboxyl, carbo-alkoxy, wherein said alkoxy group has 1 to 4 carbon atoms, or carbophenoxy, p is 0, 1 or 2 and m is 0, 1 or 2.

12 Claims, No Drawings

PROCESS OF PREPARING PYRANTHRONE PIGMENTS

BACKGROUND OF THE INVENTION

1. Field of the Invention

The present invention relates to pyranthrone pigments of good hiding properties.

2. Description of the Prior Art

In the preparation of organic pigments, a crude pigment is first formed which must be treated by a "finishing" procedure to develop the optimum tinctorial properties, brilliance and hiding power of the pigment.

The properties of a pigment, including hue, hiding power, etc., are not solely a function of chemical structure, but are influenced significantly by such factors as particle size, size distribution, shape, crystal structure and nature of the pigment surface. One common technique for achieving optimum particle conditions, has been to mill, dissolve and/or reprecipitate the pigment to attempt to achieve optimum conditions. One such technique has been to dissolve the crude pigment in a suitable solvent, such as concentrated sulfuric acid, and then to effect reprecipitation in a non-solvent such as ice, water, or ice-water mixtures. For some pigments, however, such a procedure results in amorphous or microcrystalline, and agglomerated particles which are not quite suitable. In those instances, the pigments may again be recrystallized or finished to provide well-formed microscopic crystals. One prior art technique to effect recrystallization has been to heat the particles at temperatures of 80°–140° C. in an aqueous suspension under either atmospheric or super-atmospheric pressure.

In particular, 6,14-dichloropyranthrone has been finished, after dissolving the crude pigment in sulfuric acid and recrystallizing in water, by heating in aqueous suspension at temperatures of from 135°–140° C. Although the resulting pigment had desirable properties, when blended with white pigments, the 6,14-dichloropyranthrone produced in this manner gave an objectionably yellowish-orange hue. Alone, these pigments were characterized by a reddish-orange coloration, and were very glassy.

SUMMARY OF THE INVENTION

Accordingly, one object of the present invention is to provide pyranthrone pigments of increased hiding power.

A further object of the invention is to provide a process for finishing pigmentary forms of 6,14-dichloropyranthrone whereby the resulting pigments are characterized by a more yellowish-orange hue in the pure shade, and a lower degree of yellowish coloration when used in combination with white pigments.

Briefly, these objects and other objects of the present invention as hereinafter will become more readily apparent from the following discussion have been attained by a process for the production of pyranthrone pigments of the formula

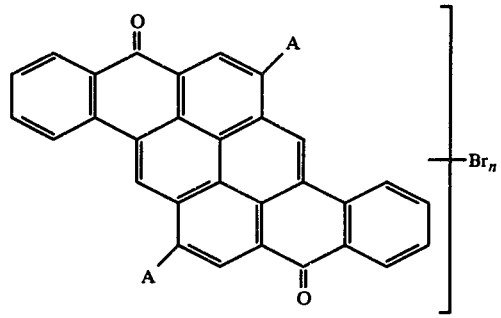

wherein n may be 0 or 1, wherein when n is 0, each A is hydrogen or chlorine, and when n is 1, each A is chlorine, which comprises recrystallizing a finely divided crude pigment of the above formula, obtained by milling or redissolving the pigment in sulfuric acid and then reprecipitating the pigment, in at least one polar organic solvent in the presence of from 0.5 to 10% by weight, based on the pyranthrone compound, of at least one anthraquinone compound of the formula

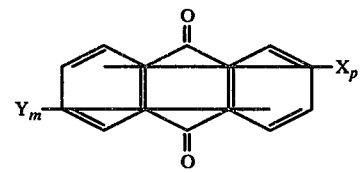

wherein X is chlorine, Y is alkyl of 1 to 4 carbon atoms, hydroxyl, carboxyl, carbo-alkoxy, wherein alkoxy is of 1 to 4 carbon atoms, or carbophenoxy, p is 0, 1 or 2 and m is 0, 1 or 2.

DETAILED DESCRIPTION OF THE PREFERRED EMBODIMENTS

The pyranthrone compounds which can be treated in accordance with the techniques of this invention include the unsubstituted pyranthrones, 6,14-dichloropyranthrone, bromine substituted 6,14-dichloropyranthrone and mixtures thereof.

According to this invention, finishing of these pyranthrone pigments is effected by heat recrystallization of a finely divided crude form of the pigment with a finely divided, particulate, anthraquinone compound of formula (II) in a polar organic liquid. The finishing is terminated when the pigment has reached optimum tinctorial strength.

The finely divided crude pyranthrone pigment can be produced, for example, by milling crude pigment for from 10 to 48 hours in a ball mill in the presence or, advantageously, in the absence of milling assistants. The materials coming from the milling operation usually consist of agglomerates of from 0.3 to 150 $\mu$m in size, which are formed by a build-up of smaller particles of a size of 0.3 $\mu$m or less. Comminution is effected by dissolving the crude pigment in concentrated sulfuric acid and precipitating the pigment by pouring the solution onto a mixture of ice and water; the temperature during precipitation should not exceed 15° C. The suspension obtained is filtered and washed until neutral. The filter residue obtained is preferably used in the form of the aqueous press cake in the subsequent recrystallization stage. However, if desired, the filter residue may be dried before subsequent treatment.

The anthraquinone compounds of formula (II) may be added to the crude pyranthrone pigment before or after comminution. In the latter case, the anthraquinone compound (II) may optionally be in a finely divided state.

Alternatively, the finishing of the recrystallized pyranthrone (I) can be effected by admixing compound (II) with the pyranthrone (I) particles, after recrystallization, and then heating the mixture. If a pigment of formula (I) which has been finished in the absence of (II), and which may be in the form of a powder or a moist powder, is used as the starting material, the pigment can be used directly. That is, the pigment does not have to be restored to a finely divided state by milling or reprecipitation from sulfuric acid.

Examples of suitable anthraquinone compounds of formula II include anthraquinone, anthraquinone-2-carboxylic acid, anthraquinone-2-carboxylic acid alkyl esters, wherein the alkyl group is of 1 to 5 carbon atoms, e.g., the methyl, ethyl, propyl and butyl esters, 1-hydroxyanthraquinone, 2-hydroxyanthraquinone, and 1-hydroxy-4-chloroanthraquinone, and especially 2-chloroanthraquinone, 1-chloroanthraquinone, 1,5-dichloroanthraquinone, 2-methylanthraquinone, 2-ethylanthraquinone, 1-chloro-2-methylanthraquinone, 2-chloro-3-methylanthraquinone, 1,3-dichloro-2-methylanthraquinone and mixtures of these anthraquinone compounds.

The amount of (II) used in the procedure of this invention ranges from 0.5 to 10% by weight, based on the crude pigment to be finished. Larger amounts of (II) produce no advantages but can cause problems when the product is used as a pigment. Amounts of from 0.5 to 5% by weight, especially from 1 to 3% by weight, based on the crude pigment to be finished, have proven to be advantageous.

Suitable organic polar solvents which may be used in the finishing operation include tetrahydrofuran, methylethylketone, methylpropylketone, methylisopropylketone, methylbutylketone, methylisobutylketone, diethylketone, di-isopropylketone, cyclohexanone, ethanol, propanol, n-butanol, isobutanol, n-pentanol, isoamyl alcohol, 2-ethyl-1-hexanol, isononanol, isodecanol and cyclohexanol, or mixtures thereof. Methylethylketone, methylisopropylketone, diethylketone, cyclohexanone, n-propanol, isobutanol, pentanol and cyclohexanol appear to be most suitable. However, for technical reasons, isobutanol is particularly preferred as the organic polar solvent.

The finishing operation can be conducted in the anhydrous organic solvent, but preferably, it may be carried out in a mixture of polar organic solvent and water. When an aqueous mixture is used, it is desirable to use a ratio of solvent:water of 1:6 to 6:1, and advantageously from 1:6 to 3:1. The amount of liquid phase is not critical provided the mixture is miscible and pourable before, during and after finishing. In general, liquid phase may be used in a weight amount of from 5 to 20, preferably from 7 to 15, times the weight amount of compound to be finished.

If a relatively high-boiling organic solvent, e.g., diisopropylketone, di-n-propylketone, 2-ethyl-1-hexanol, isononanol or isodecanol, mixed with water, is used as the finishing medium, it is advantageous to add small amounts, e.g., from about 5 to 25 parts per 150 parts of water, of a solubilizing agent, e.g., methanol or ethanol. This additive improves dispersibility of the sparingly water-soluble solvent and hence makes the finishing mixture easier to stir.

Finishing may be conducted at a temperature of from 30 to 180° C. In mixtures of water and organic solvent, recrystallization may be carried out at from 30° C. to the boiling point of the liquid phase. If the finishing is conducted under super-atmospheric pressure, processing may occur at a temperature above the boiling point of the liquid phase, at up to 150° C., e.g. at from 95 to 150° C., preferably from 100 to 125° C. Advantageously, however, recrystallization is conducted under normal pressure at, or below, the boiling point of the water-solvent mixture. Recrystallization of the fine particles is usually complete within 2 to 6 hours at or near the boiling point of the liquid phase. In the absence of water, finishing is advantageously carried out at from 80 to 180° C.

The pigment can be further isolated by filtering, and the filter residue washed with a water-miscible solvent to remove the organic solvent. The residue may then be washed with water and dried, if required. If a relatively volatile solvent is used in the process, it may be removed by steam distillation, which may require from 1 to 4 hours. Until the organic solvent has been removed, recrystallization will continue. Hence, a shorter finishing time is usually sufficient.

During the filtering operation, the residual amounts of compound (II) will be substantially separated from the pigment. This is above all advantageous if substantial amounts of (II) have been used.

When steam distillation is used for recovery, compound (II) will, of course, remain in the pigment. Less than 5% by weight of (II), based on (I), may be tolerated without undue interference with the pigmentary characteristics of the product.

If recrystallization is carried out in the presence of anthraquinone compounds of formula (II) which contains a hydrophilic group, such as an hydroxyl group or a carboxyl group, separation can be effected by an aqueous work-up method following finishing. For example, an aqueous suspension of the pigment can be rendered alkaline in order to dissolve the anthraquinone compound (II), if it contains an hydroxyl or carboxyl group. Upon filtration, the dissolved portion of the compound will be removed with the alkaline filtrate.

If anthraquinone carboxylic acid esters are used, these can also be subjected to alkaline hydrolysis, after finishing, and can then be substantially removed from the pigment.

Having generally described the invention, a more complete understanding can be obtained by reference to certain specific examples, which are included for purposes of illustration only and are not intended to be limiting unless otherwise specified.

Parts and Percentages are by Weight.

A. The pigments according to the invention and the pigments prepared for comparison purposes were compared with respect to the colorations produced, using the following methods:

I. 10% strength full-shade baking finish on paper:
a. 30% strength full-shade paste:

3 parts of pigment are milled with 7 parts of a varnish-like binder (= Grinding Base 100 S from Lawter Chemicals, Inc., Chicago) on a triple roll mill with 6 passes under 80 bars roll pressure, to give a 30% strength full-shade paste.

b. 10% strength full-shade paste finish used for coloring:

2 parts of full-shade paste (a) are mixed with 4 parts of a binder mixture obtained by mixing 1 part of an alkyd resin modified with soybean oil, 2 parts of an alkyd resin modified with synthetic fatty acid and 3 parts of a solvent-free melamine resin.

c. Coloring procedure:

A 100 μm thick layer of finish b) is applied to a board by means of a film spreader and is baked for 45 minutes at 120° C. in a drying oven.

II. 1:20 reduced baking finish:

a. 30% strength white paste:

42 parts of a binder which consists of a mixture of 1 part of an alkyd resin modified with soybean oil and 2 parts of an alkyd resin modified with synthetic fatty acid are milled with 30 parts of titanium dioxide (rutile), 22 parts of a solvent-free melamine resin and 6 parts of colloidal silica on a triple roll mill with 6 passes under 80 bars roll pressure, to give a 30% strength white paste.

b. Paste finish used for coloring:

0.5 parts of 30% strength full-shade paste (Ia) and 10 parts of 30% strength white paste (IIa) are mixed, and milled together, on a millstone mill.

c. Coloring procedure:

A 100 μm thick layer of finish (b) is applied to a board by means of a film spreader and is baked for 45 minutes at 120° C. in a drying oven.

B. The finely divided crude 6,14-dichloropyranthrone required for Examples 1 to 25 was prepared as follows:

200 parts of 6,14-dichloropyranthrone are dissolved in 2,000 parts of 100% strength sulfuric acid at a temperature from 20 to 25° C. The dichloropyranthrone is then precipitated by pouring onto a mixture of water and ice, with the temperature not exceeding 10° C. After filtering, and washing until neutral with water, the product is thoroughly suction-drained and an aqueous dye paste which contains 12% of dichloropyranthrone is obtained.

EXAMPLE 1 (Comparative Example)

167 parts of a paste, of about 12% strength, obtained as described in B are stirred with 3 parts of water and 50 parts of isobutanol and the mixture is heated to boiling and stirred at this temperature for 4 hours under reflux conditions. Steam is then passed into the mixture for 60 minutes so as to remove the isobutanol by distillation through a descending condenser. The product is filtered, washed with a little hot water and dried under reduced pressure at 80° C. After crushing in a mortar, a pigment powder is obtained in virtually quantitative yield. Specific surface area determined by the BET method: 64 $m^2/g$.

When used as described in A-I, the pigment gives a transparent full-shade coloration having a reddish-orange hue.

When used as a white reduction as described in A-II, a yellowish-orange coloration is obtained.

Both colorations exhibit very good fastness to light and weathering.

EXAMPLE 2

167 parts of a 6,14-dichloropyranthrone paste of 12% strength which is obtained as described in B, 3 parts of water and 0.4 part of 2-chloranthraquinone are introduced into 50 parts of isobutanol and the mixture is heated to boiling (about 90°–91° C.) with stirring and is then stirred at this temperature for 4 hours. It is worked up as described in Example 1 and a pigment powder is obtained in virtually quantitative yield. Specific surface area determined by the BET method: 37 $m^2/g$. If a full-shade baking finish is produced as described in A-I, it has much greater hiding power and colorations produced therewith have a substantially yellower orange hue, than is achieved in the case of the pigment from Comparative Example 1.

A baking finish using a 1:20 reduction, as described in A-II, has a substantially less yellow hue than the coloration given by the pigment obtained as described in Example 1.

EXAMPLES 3 to 21

The procedure described in Example 2 is followed, but instead of 0.4 part of 2-chloroanthraquinone, X parts of additive Z are used. The pigment powders are obtained in virtually quantitative yield and, when used in a full-shade baking finish as described in A-I, have much better hiding power and give substantially yellower colorations than the pigment prepared without the presence of an additive as described in Example 1, while in a blend as described in A-II they give substantially less yellowish orange colorations than the pigment prepared without using the additive.

| Example No. | X Parts | Additive Z | Surface area measured by the BET method $m^2/g$ |
|---|---|---|---|
| 3 | 0.4 | 2-ethylanthraquinone | |
| 4 | 0.4 | 2-methylanthraquinone | 34 |
| 5 | 1 | 2-methylanthraquinone | |
| 6 | 1 | 2-chloroanthraquinone | |
| 7 | 0.2 | 2-ethylanthraquinone | |
| 8 | 0.4 | 1-chloroanthraquinone | |
| 9 | 0.4 | 1,5-dichloroanthraquinone | |
| 10 | 0.4 | 1-chloro-2-methylanthraquinone | |
| 11 | 0.4 | 2-chloro-3-methylanthraquinone | 39 |
| 12 | 1 | 2-chloro-3-methylanthraquinone | |
| 13 | 0.2 | 2-chloro-3-methylanthraquinone | 2-chloro-3-methylanthraquinone |
| 14 | 0.4 | 1,3-dichloro-2-methylanthraquinone | |
| 15 | 0.4 | anthraquinone | 48 |
| 16 | 0.4 | 1-hydroxyanthraquinone | |
| 17 | 0.4 | 2-hydroxyanthrquinone | |
| 18 | 0.4 | 1-hydroxy-4-chloroanthraquinone | |
| 19 | 0.4 | anthraquinone-2-carboxylic acid | |
| 20 | 0.4 | anthraquinone-2-carboxylic acid methyl ester | |
| 21 | 0.2 | 1,5-dichloroanthraquinone | |

| Example No. | X Parts | Additive Z | Surface area measured by the BET method m²/g |
|---|---|---|---|
| | +0.2 | anthraquinone-2-carboxylic acid | |

EXAMPLE 22

The procedure employed in Example 20 is followed, but after removing the isobutanol by distillation, the pH is brought to 9–10 adding sodium carbonate and the mixture is boiled for a further hour. After filtering, washing until neutral and further working-up, the pigment obtained is entirely similar to that obtained by the method used in Example 20.

EXAMPLE 23

The procedure described in Example 2 is followed, but the mixture is heated for 4 hours at 100°–110° C. in a closed vessel. After working up, the pigment obtained is entirely similar to that obtained as described in Example 2.

EXAMPLE 24

The procedure described in Example 2 is followed, but instead of isobutanol, 50 parts of methylethylketone are used. After working up, the pigment powder obtained has substantially greater hiding power and produces yellower full-shade finishes (produced as described in A-I) than does a pigment powder prepared under identical conditions but without addition of 2-chloroanthraquinone.

EXAMPLE 25

The procedure described in Example 2 is followed, but instead of isobutanol 50 parts of tetrahydrofuran are used. The pigment powder obtained gives a full-shade finish of greater hiding power than does a pigment powder prepared under identical conditions but without addition of 2-chloroanthraquinone.

EXAMPLE 26

The procedure described under B is followed, but 4 parts of 2-chloroanthraquinone are added to the solution of 6,14-dichloropyranthrone in sulfuric acid and the product is worked up as described in B, to give a dye paste containing 2-chloroanthraquinone. 167 parts of the paste are finished as described in Example 2. The pigment powder obtained has the same properties as the powder described in Example 2.

EXAMPLE 27

A mixture of 20 parts of 6,14-dichloropyranthrone and 0.4 part of 2-chloro-3-methylanthraquinone is milled for 15 hours in a planetary ball mill. The finely milled mixture is then introduced into 150 parts of water and 50 parts of isobutanol and the batch is heated to boiling, stirred at the boiling point for 4 hours and then worked-up as described in Example 2. The pigment powder obtained has greater hiding power when used in full-shade finish (as described in A-I) and is substantially redder when used in a blend (as described in A-II) than a pigment prepared under identical conditions but without addition of 2-chloroanthraquinone.

EXAMPLE 28

200 parts of pyranthrone (prepared as described in German Published Application, DAS 2,115,131, Example 28) are converted to a 12% strength dye paste as described in B. 167 parts of the paste are then converted to a pigment powder in the presence of 0.4 part of 2-chloroanthraquinone, using the method described in Example 2. The pigment powder gives a yellower full-shade finish (as described in A-I) of greater hiding power than does a pigment prepared under identical conditions but without addition of 2-chloroanthraquinone.

If instead of 0.4 part of 2-chloroanthraquinone, 0.4 part of 2-methylanthraquinone is used, the pigment obtained gives similar full-shade colorations when used as described in A-I.

EXAMPLE 29

155 parts of the aqueous dye paste obtained as described in Example 9 of German Patent 2,017,450 and containing 12.9% of brominated 6,14-dichloropyranthrone with an average of about 0.9 bromine atom per molecule are stirred with 15 parts of water, 0.4 part of 2-chloroanthraquinone and 50 parts of isobutanol, and the mixture is heated to boiling (about 90°–91° C.) and stirred at this temperature for 4 hours. It is worked-up as described in Example 2 and a pigment powder is obtained in virtually quantitative yield. This powder, when used as described in A-I, gives a yellower full-shade finish of greater hiding power than does a pigment prepared under otherwise identical conditions, but without addition of 2-chloroanthraquinone.

EXAMPLE 30

The procedure followed is initially as described in Example 1 (Comparative Example), but after 4 hours at boiling 0.4 part of 2-chloroanthraquinone powder is added, the mixture is again kept at the boiling point for 4 hours and the product is then worked up as described in Example 1. The pigment obtained has virtually the same tinctorial properties as that obtained as described in Example 2.

EXAMPLE 31

20 parts of the pigment powder obtained as described in Example 1 are introduced into 150 parts of water and 50 parts of isobutanol. After adding 0.4 part of 2-chloroanthraquinone the mixture is heated to the boiling point while stirring and is stirred at the boiling point for 4 hours. Working up is continued as described in Example 2. The pigment obtained in quantitative yield is tinctorially similar to that obtained as described in Example 2.

If instead of the 20 parts of the pigment powder obtained as described in Example 1, 60 parts of the watery press cake of about 33% strength, obtained as described in the same Example, are used, a pigment with similar tinctorial properties is obtained.

EXAMPLE 32

The finely divided dye paste obtained as described in B is dried under reduced pressure at 80° C. and pulverized in a mortar. 20 parts of this powder are treated as described in the first paragraph of Example 31. The pigment powder obtained is similar to that obtained as described in Example 2.

EXAMPLE 33

The finely divided dye paste obtained as described in B is dried under reduced pressure at 80° C. and pulverized in a mortar. 20 parts of this powder, 150 parts of isobutanol and 0.4 part of 2-chloroanthraquinone are heated to the boiling point and kept at this temperature for 4 hours. The mixture is then allowed to cool to 50°–60° C., and the product is removed by filtration, washed with methanol and then with water, and dried under reduced pressure at 80° C.

After grinding, the pigment powder is obtained in virtually quantitative yield; it has greater hiding power in full-shade colorations than a pigment powder finished without addition of 2-chloroanthraquinone.

EXAMPLES 34 to 40

The procedure described in Example 2 is followed, but instead of 50 parts of isobutanol, 50 parts of the polar solvent C are used. After work-up, the pigment obtained exhibits greater hiding power and gives yellower full-shade colorations, and a redder coloration upon white reduction, than does a comparative pigment finished using the same solvent C but in the absence of 2-chloroanthraquinone.

The time required to remove solvent C by steam distillation is about 2 hours, because of the higher boiling points of the solvents.

| Ex. No. | Solvent C | Surface area in $m^2/g$, measured by the BET method | |
|---|---|---|---|
| | | Prepared without additive | Prepared with additive |
| 34 | n-propanol | | |
| 35 | n-pentanol | 46.5 | 31.6 |
| 36 | cyclohexanol | 42.5 | 25.5 |
| 37 | methylisopropyl-ketone | | |
| 38 | methyl-n-propyl ketone | | |
| 39 | diethylketone | 38.3 | 29.6 |
| 40 | cyclohexanone | 38.2 | 26.9 |

EXAMPLES 41 to 45

If the procedure described in Examples 34 to 40 is followed, but 50 parts of solvent D are used, the aqueous and organic phases remain visibly separate during the finishing treatment.

The pigment is taken up by the organic phase. Finishing of the pigment which occurs in the organic phase results, after removing the aqueous phase, displacing solvent D with methanol and further working-up by washing the pigment with water and drying under reduced pressure at 80° C., in a pigment which gives a somewhat yellower full-shade finish of greater hiding power than a comparative pigment prepared using the same solvent D, but in the absence of 2-chloroanthraquinone, and worked up in the same manner.

| Example No. | Solvent D |
|---|---|
| 41 | 2-ethylhexanol |
| 42 | iso-nonanol |
| 43 | iso-decanol |
| 44 | diisopropylketone |
| 45 | di-n-propylketone |

EXAMPLE 46

The procedure described in Example 44 is followed, but 10 parts of methanol are added to the reaction mixture. Pigment with similar tinctorial properties is obtained.

When the finely divided pyranthrone is recrystallized in the presence of an anthraquinone compound of formula II, a pigment is formed which yields significantly more opaque colorations than the pigment form obtained from the same finely divided pyranthrone, under otherwise identical conditions, in the absence of the compounds (II). Furthermore, the pigmentary form of the present invention exhibits the following advantages: it exhibits significantly more yellowish hues as the full shade, and significantly less yellowish colorations when blended with white pigments; the finished pigment is more easily dispersed and the colorations exhibit fastness to weathering which is as good, or somewhat better, than the pigment forms obtained under otherwise identical conditions in the absence of compound (II).

The pigments of this invention can be used in the same manner as conventional pyranthrone pigments of similar type, with the above advantages.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for the production of pyranthrone pigments of the formula:

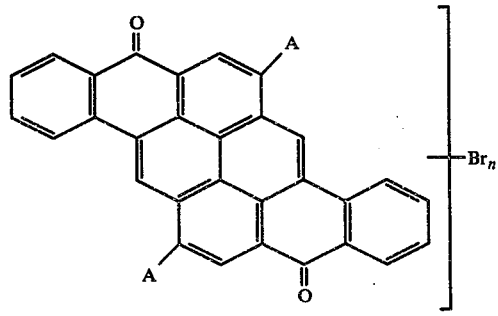

wherein n may be 0 or 1, wherein when n is 0, each A is hydrogen or chlorine, and when n is 1, each A is chlorine, which comprises:

crystallizing a finely divided crude pigment of the above formula, obtained by milling or dissolving a crude pigment of the above formula in sulfuric acid and then precipitating said dissolved pigment, in at least one polar organic solvent in the presence of from 0.5 to 10% by weight, based on the pyranthrone compound, of at least one anthraquinone compound of the formula:

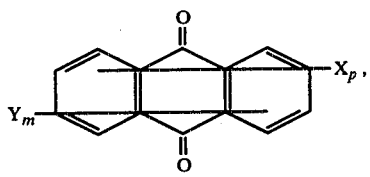

wherein X is chlorine, Y is alkyl of 1 to 4 carbon atoms, hydroxyl, carboxyl, carbo-alkoxy, wherein alkoxy is of 1 to 4 carbon atoms, or carbophenoxy, p is 0, 1 or 2 and m is 0, 1 or 2.

2. The process of claim 1, wherein the recrystallization is carried out in the presence of from 0.5 to 5% by weight, based on the crude pigment, of the anthraquinone compound.

3. The process of claim 1, wherein the said crystallization is carried out in a mixture of polar organic solvent and water.

4. The process of claim 1 wherein said recrystallization is carried out in the presence of from 1 to 3% by weight, based on the crude pigment, of the anthraquinone compound.

5. The process of claim 1, wherein said finely divided crude pigment is a finely divided agglomerated crude pigment containing primary particles of a size of at most 0.3 μm.

6. The process of claim 1, wherein said anthraquinone compound is anthraquinone, anthraquinone-2-carboxylic acid, anthraquinone-2-carboxylic acid alkyl esters, wherein said alkyl group is of 1 to 5 carbon atoms, 1- and 2-hydroxyanthraquinone, 1-hydroxy-4-chloroanthraquinone, 2- and 1-chloroanthraquinone, 1,5-dichloroanthraquinone, 2-methyl- and 2-ethylanthraquinone, 1-chloro-2-methylanthraquinone, 2-chloro-3-methylanthraquinone, 1,3-dichloro-2-methylanthraquinone or mixtures thereof.

7. The process of claim 1, wherein said anthraquinone compound is 2-chloroanthraquinone, 1-chloroanthraquinone, 1,5-dichloroanthraquinone, 2-methylanthraquinone, 2-ethylanthraquinone, 1-chloro-2-methylanthraquinone, 2-chloro-3-methylanthraquinone or 1,3-dichloro-2-methylanthraquinone.

8. The process of claim 1, wherein the organic polar solvent is tetrahydrofuran, methylethylketone, methylpropylketone, methylisopropylketone, methylbutylketone, methylisobutylketone, diethylketone, di-isopropylketone, cyclohexanone, ethanol, propanol, n-butanol, iso-butanol, n-pentanol, isoamyl alcohol, 2-ethyl-1-hexanol, isononanol, isodecanol, cyclohexanol or mixtures thereof.

9. The process of claim 2, wherein the polar organic solvent is methylethylketone, methylisopropylketone, diethylketone, cyclohexanone, n-propanol, isobutanol, pentanol, cyclohexanol or mixtures thereof.

10. The process of claim 1, wherein the recrystallization is carried out in a mixture of water and at least one polar organic solvent selected from the group consisting of tetrahydrofuran, methylethylketone, methylpropylketone, methylisopropylketone, methylbutylketone, methylisobutylketone, diethylketone, di-isopropylketone, cyclohexanone, ethanol, propanol, n-butanol, iso-butanol, n-pentanol, isoamyl alcohol, 2-ethyl-1-hexanol, isononanol, isodecanol and cyclohexanol, wherein the ratio of organic solvent to water is from 1:6 to 6:1, expressed in parts by weight.

11. The process of claim 2, wherein the recrystallization is carried out in a mixture of water and at least one polar organic solvent selected from the group consisting of methylethylketone, methylisopropylketone, diethylketone, cyclohexanone, n-propanol, isobutanol, pentanol and cyclohexanol, wherein the ratio of water to organic solvent is from 1:6 to 6:1, expressed in parts by weight.

12. The process of claim 1, wherein the recrystallization is carried out at a temperature of from 30° to 180° C.

* * * * *